United States Patent [19]

Woodroffe

[11] E Patent Number: Re. 33,777

[45] Reissued Date of Patent: Dec. 24, 1991

[54] LASER REMOVAL OF POOR THERMALLY-CONDUCTIVE MATERIALS

[75] Inventor: Jaime A. Woodroffe, Andover, Mass.

[73] Assignee: Avco Corporation, Providence, R.I.

[21] Appl. No.: 544,616

[22] Filed: Jun. 27, 1990

Related U.S. Patent Documents

Reissue of:

[64] Patent No.: 4,756,765
Issued: Jul. 12, 1988
Appl. No.: 560,672
Filed: Dec. 12, 1983

U.S. Applications:

[63] Continuation-in-part of Ser. No. 342,787, Jan. 26, 1982, abandoned.

[51] Int. Cl.[5] ..... B08B 7/00

[52] U.S. Cl. ..... 134/1; 134/38; 219/121.85

[58] Field of Search ..... 134/1, 38; 219/121.6, 219/121.61, 121.72, 121.78, 121.79, 121.80, 121.85, 121.82; 156/643

[56] References Cited

U.S. PATENT DOCUMENTS 3,503,804 3/1970 Schneider ..... 134/1
4,063,063 12/1977 Funck et al. ..... 219/121 LM
4,368,080 1/1983 Langen et al. ..... 134/1

OTHER PUBLICATIONS

Aviation Week and Space Tech. (Jan. 29, 1979), p. 55.
Lowndes, "Metallic Composites Coating Yields Gains", Aviation Week and Space Tech. (Nov. 24, 1980), p. 58.
Hawkins et al., "Laser Removal of Polymer Coating", IBM Tech. Discl. Bull., vol. 12, No. 6, Nov. 1969, p. 735.
Aviation Week and Space Tech., "Protection Against High-Energy Laser Found" (Jun. 16, 1980), p. 232.
Electronics, "Lasers Strip Wire Insulation", vol. 49, No. 19 (Sep. 16, 1976), pp. 50, 52.

*Primary Examiner*—Asok Pal
*Attorney, Agent, or Firm*—Perman & Green

[57] ABSTRACT

A method of removing material of poor thermal conductivity such as paint, grease, ceramics, and the like from a substrate by ablation without damage to the substrate by delivering to the material to be removed pulses or their equivalent of a laser beam having a wavelength at which the material to be removed is opaque and a fluence sufficient to ablate or decompose the material without damaging or adversely affecting the substrate or its surface.

5 Claims, 3 Drawing Sheets

LASER REMOVAL OF POOR THERMALLY-CONDUCTIVE MATERIALS

Matter enclosed in heavy brackets [ ] appears in the original patent but forms no part of this reissue specification; matter printed in italics indicates the additions made by reissue.

BACKGROUND OF THE INVENTION

This application is *a reissue application of U.S. Pat. No. 4,756,765 issued July 12, 1988; Ser. No. 06/560,672 filed Dec. 12, 1983 which was* a continuation-in-part of patent application Ser. No. 342,787 filed Jan. 26, 1982, now abandoned.

Maintenance of metal, composites, and other materials covered or painted with a material of poor thermal conductivity such as, for example, paint, grease, ceramics, and the like is quite often a substantial contributor to the cost of ownership. Thus maintenance of painted surfaces is a substantial contributor to the cost of owning aircraft.

Toxic, phenolic paint-stripping solvents are labor intensive and hazardous to use. Acids and abrasives damage airframe exteriors, and residual moisture from solvents trapped by skin seams and rivets promotes corrosion.

Paint-stripping damage to a composite aircraft surface is more severe than to a metallic aircraft surface because the boundary between the paint and the airframe material is less distinct for composite structures.

A non-solvent paint-stripping technique presently being considered for use involves the use of high-energy flashlamps. Whether or not this technique will be found to be useful depends on the extent to which the difference in thermal expansion properties of paint and metal is great enough and operative when exposed to a high-energy flashlamp to break the adhesive seal that bonds the paint to the metal.

It is a principal object of this invention to provide a method of removing from a substrate material opaque to a laser beam and of poor thermal conductivity that presents minimum risk to the users and which is less expensive, less time-consuming, more efficient, and/or which results in minimum risk to the substrate being processed.

SUMMARY OF THE INVENTION

Briefly, a material or poor thermal conductivity such as paint, grease, ceramic and the like is removed from a substrate by preferably sweeping a pulsed laser beam over the material to be removed. The laser beam must have a wavelength at which the material to be removed is opaque and must be carefully controlled in accordance with the invention to cause ablation of the material to be removed without damaging the substrate or its surface. For this purpose, the fluence of each pulse of the laser beam or its equivalent delivered to the material is selected to be sufficient to bring the surface of the material to be removed to steady-state ablation, but insufficient to cause plasma formation with accompanying damage to the substrate. As used herein, "steady-state" ablation means ablation where a surface is brought up to a high enough temperature (in a time short compared to the pulse length for pulsed operation) that vaporization or decomposition of the surface occurs for at least a substantial portion of the pulse. Further, as used herein, the term "paint" means a protective or decorative coating applied in relatively small thicknesses (<0.050 inch) to a substrate, and consisting of an organic matrix containing inorganic pigment particles. An example of a detailed description (applying specifically to military aircraft) of a paint coating is MIL-C-83286 (top coat) and MIL-P-23377 (primer). A laser is selected that operates at a wavelength at which the material to be removed is opaque to insure absorption of the laser beam by the material to be removed and consequent ablation. There are conventional and well-known tests that can be used to determine paint absorptivity as a function of wavelength. Such absorptivity typically will preferably correspond to an absorption depth in the range of a few microns.

While use of a pulsed laser beam is preferable, a CW laser beam may be used if, for example, spot size, fluence, sweep speed, and the like are controlled whereby the effect is as if a pulsed beam was used. The required fluence (energy per unit area) can be delivered in a single pulse or, preferably, in a plurality of pulses. However, the fluence, whether delivered by a pulsed or CW laser beam, must be delivered in a time short compared to that required for heat to substantially diffuse away from the surface of the absorption layer, which is to say the material to be removed. Pulse lasers having very short pulses such as, for example, TEA lasers, are unsuitable because their typical short pulse ($\sim 1$ $\mu$sec) is so short that even with the use of multiple pulses on a single spot, steady-state ablation without surface damage is not practically attainable.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

DESCRIPTION OF PREFERRED EMBODIMENTS

Figure 1:
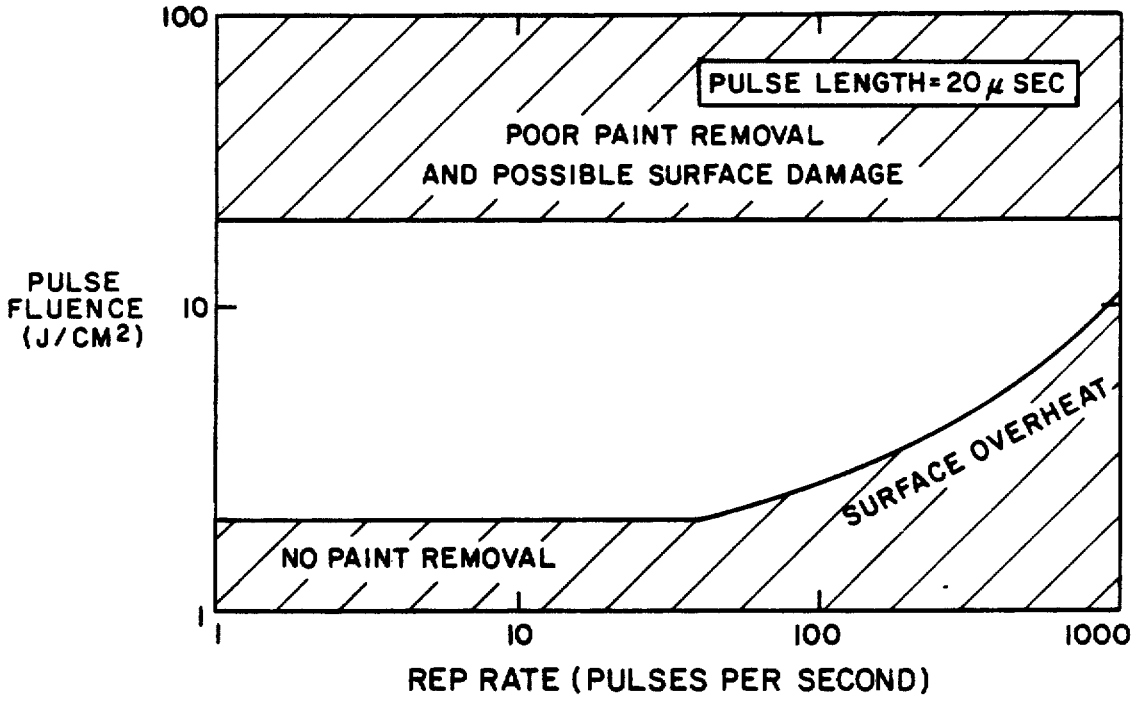
FIG. 1 is a graphic representation illustrating approximately the region that may be expected for satisfactory performance for a given application utilizing a 20 $\mu$sec pulse length for removing paint from an aluminum substrate.

It is to be understood that the present invention is not limited to the use of a laser beam of a particular wavelength. Assuming that the necessary fluence for a particular application can be generated, the laser must provide a laser beam having a wavelength at which the material to be removed is sufficiently opaque to insure effective absorption.

Thus, while the present invention is not limited to the use of any particular laser, whether pulsed or CW, it will now be explained by way of example and for purposes of convenience and simplicity in connection with a pulsed $CO_2$ laser of conventional design and operation to remove paint from an aluminum substrate.

A typical coat of paint on an aluminum substrate forming part of an airplane will have a coat of primer 0.6–0.9 mil thick and a coat of paint 1.4–2.8 mil thick. Assuming a total thickness of 0.003 inches (75$\mu$) and a typical paint ablation energy Q* of approximately 5 KJ/gm (or ~10 KJ/cc), the total laser beam fluence $F_t$ required in this case is:

$$F_t \sim \rho l Q^*$$

$$F_t \sim 75 \text{ J/cm}^2$$

where $\rho$ is the density of the paint and l is the paint layer thickness. This fluence or energy in joules/cm$^2$, as previously noted, can be delivered by a single pulse, a series of pulses, or a CW beam having the effect as if it were pulsed.

If the fluence per pulse is too small, ablation does not occur. The fluence $F_a$ to reach the ablation temperature for paint (about $2\times10^{3°}$ K.) is:

$$F_a \sim L\rho C_p \Delta T$$

$$F_a \sim 5\times10^{-4}\times2\times1\times2\times10^3$$

$$F_a \sim 2 \text{ J/cm}^2$$

where L is the absorption depth of the laser beam in centimeters, $\rho$ is the density, $C_p$ is the heat capacity of the paint, and $\Delta T$ is the temperature change to reach the ablation temperature.

Ideally, the fluence per pulse $F_p$ should be considerably greater than $F_a$ or:

$$F_p >> 2 \text{ J/cm}^2$$

The fluence delivered by the laser beam to the covering material which is intended to be removed, must be delivered in a time short compared to that required for heat to diffuse away from the surface of the covering material to prevent excessive heating of the substrate. Thus, assuming an absorption depth L of 5$\mu$, this time $t_{max}$ is:

$$t_{max} \sim \frac{L}{\alpha}$$

$$t_{max} \sim \frac{(5\times10^{-4})}{2\times10^{-3}}$$

$$t_{max} \sim 100 \ \mu\text{sec}$$

where $\alpha$ is the thermal diffusivity in cm$^2$/sec of the paint.

A pulse beam is preferable since the inherent high heating rate possible during the pulse provides essentially complete flexibility regarding the average fluence. However, a CW laser beam focussed so that its average flux is considerably greater than 2 J/cm$^2$/100 $\mu$sec, or considerably greater than 20 KW/cm$^2$, would be suitable.

It has been found that when paints are irradiated with a CW laser at fluxes below a few KW/cm$^2$, the paint chars and sticks to the substrate, as opposed to being removed. Attempting to remove the paint this way may be expected to result in severe damage to the substrate. Operation of a pulsed laser at fluences less than $F_a$ (i.e., less than 2 J/cm$^2$) can also result in paint charring and eventual substrate damage.

In order to prevent damage to the substrate such as, for example, pitting, it is necessary to avoid plasma formation. Plasma formation is undesirable because the absorptivity of paint to plasma radiation is poorer than to the laser light. Plasma formation will be avoided if the fluence per pulse $F_p$ is:

$$F_p < 10^6 t_p$$

$t_p$ is the laser pulse length.

A reasonable choice of $F_p$ is about 10 J/cm$^2$, and a reasonable choice of $t_p$ is about 20 $\mu$sec.

For a typical laser pulse length $t_p$ of about 20 $\mu$sec, it will be seen that TEA lasers and the like having pulses of about 1 $\mu$sec are unsuitable, but that, for example, electron beam-sustainer $CO_2$ lasers having a pulse length of about 5–50 $\mu$sec may be used. For the parameters here considered, the number of pulses $N_p$ required is:

$$N_p \sim F_t/(F_p - F_a)$$

$$N_p \sim 75/(10-2)$$

$$p \sim 10$$

Fluence in excess of that producing ablation is conducted into the substrate. Assuming a remaining thickness $h \sim 10\mu$ and a thermal diffusivity $\alpha_p \sim 2\times10^{-3}$ cm$^2$/sec, the characteristic time $t_h$ for conduction through the paint on the last pulse is:

$$t_h \sim \frac{h^2}{\alpha_p}$$

$$t_h \sim \frac{(10^{-3})^2}{2\times10^{-3}}$$

$$t_h \sim 5\times10^{-4} \text{ sec}$$

Assuming a characteristic time $t_h$ of $5\times10^{-4}$ sec as the "pulse length" for thermal deposition into an aluminum skin, the increase in temperature $\Delta T_p$ is:

$$\Delta T_p \sim \frac{F_a}{\rho C_p (\alpha_{Al} t_h)^{\frac{1}{2}}}$$

$$\Delta T_p \sim \frac{2}{3\times\left(\frac{1}{2}\times5\times10^{-4}\right)^{\frac{1}{2}}}$$

$$\Delta T_p \sim 50° \text{ C.}$$

where $\alpha_{Al}$ is the thermal diffusivity of aluminum.

An increase in temperature of an aluminum skin of approximately 100° C. is much less than the solidus temperature of approximately 50° C., over a depth of less than 0.02 cm. For a 1/16 inch (0.16 cm) thick aluminum substrate, the total temperature rise $\Delta T_t$ during the process will be:

$$\Delta T_t \sim \frac{N_p F_a}{(\rho C_p l)}$$

$$\Delta T_t \sim \frac{20}{3 \times 0.16}$$

$$\Delta T_t \sim 40^\circ \text{ C.}$$

where $N_p$ is the number of pulses. As will be seen from the above, for the present example in accordance with the invention, the temperature change of the substrate does not present a problem.

As compared to prior art processes, the present invention affords considerable advantage. Thus assuming the use of a conventional pulsed $CO_2$ laser providing an average beam power of about 20 KW and the requirement of 10 J/cm$^2$ for ten pulses per spot to totally clean a spot of paint on an aluminum substrate, a 200 J/100 pps (20 KW average power) 20 μsec pulse length laser could process 20 spots per second at a 10 cm$^2$ spot size, or 200 cm$^2$/sec. A small airplane has an area of about $10^6$ cm$^2$. Accordingly, using the present invention, the clean-up time for such an airplane would be only about one hour of laser beam application time.

Typically, presently available pulsed lasers otherwise suitable for use in carrying out the present invention will not have the desired pulse rate per spot for a given application. In this case, I have found that such a typical laser may be most advantageously used if its pulsed beam is swept over the material to be removed in a so-called "batch" processing mode in accordance with the invention.

By way of example and explanation, assume that the cross section of the laser beam as it impinges on the surface of the material to be removed is square and that each "spot" must be irradiated three times at one-fifth of the repetition rate of the laser to effect satisfactory removal of the paint or the like to be removed. For this case, the laser beam is simply caused in conventional manner to sequentially irradiate five portions or "spots". Upon completing irradiation of the fifth consecutive portion, the laser beam is caused to return to the first portion (or a point one third the lineal distance of the first portion) and then to move to five consecutive portions. Upon completion of this phase, the laser beam is caused to again return to the first portion (or to return to a point two-thirds of the lineal distance of the first portion) and then to again move on to five consecutive portions for five pulses. For the case here assumed, it may now be readily seen that each "spot" will receive three pulses at the desired one-fifth the repetition rate of the laser.

On the other hand, if, for example, it is desired that each spot receive three pulses as noted above, this may be accomplished by providing linear motion of the laser beam so that for each pulse, the laser beam is advanced one-third of the linear distance of each portion. Again, if desired, the laser beam may be simply caused in conventional manner to move linearly, pausing over each spot to deliver the number of pulses desired or determined to be necessary.

Directing attention now to FIG. 1, inspection of this figure will show by way of example and illustration in accordance with the invention the rather large region that may be typically expected for satisfactory performance of the removal of a typical coat of paint and an underlying coat of a primer on an aluminum substrate such as, for example, aluminum aircraft skin.

As may be seen, for the assumed laser pulse length of 20 μsec in accordance with the invention, the provision of a repetition rate and pulse fluence between the upper and the lower lines delineating the center region will result in removal of the overlying paint and primer coat without adversely affecting the underlying aluminum skin. In actual practice, a coat of paint and primer was removed using a laser pulse having a fluence of 6 J/cm$^2$, a pulse length of 15 μsec and processing a piece of aircraft aluminum skin in accordance with the invention at the rate of 100 pulses per second.

Figure 2:
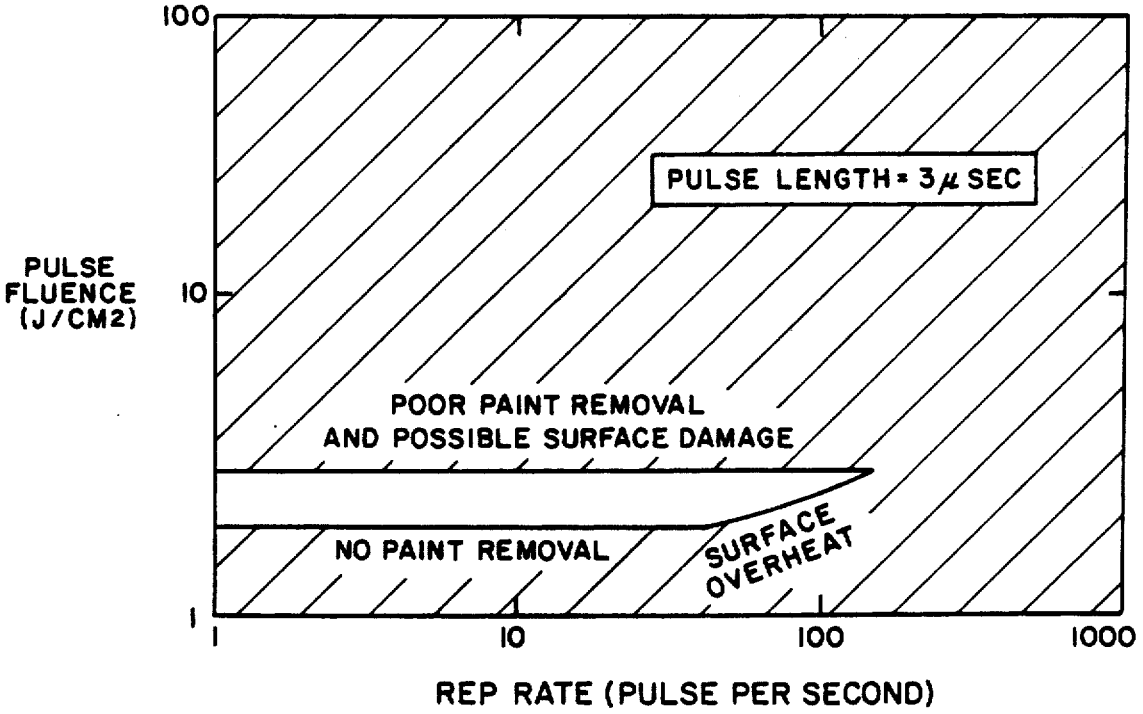
FIG. 2 is a graphic representation illustrating the reduction over that shown in FIG. 1 in the region that may be expected for satisfactory performance for a reduced laser pulse length of 3 $\mu$sec.

FIG. 2 illustrates the importance of the pulse length or its equivalent and the extent to which the region of satisfactory performance will be reduced, as compared to that of FIG. 1, for the same operating conditions, if the pulse length is reduced to 3 μsec. Thus, as is illustrated by FIG. 2, although paint can in theory be removed at pulse lengths of 3 μsec can less, it is not likely in actual practice that satisfactory performance will be achieved since it will be very difficult, if not impossible, to maintain the operating parameters within the necessary region.

Figure 3:
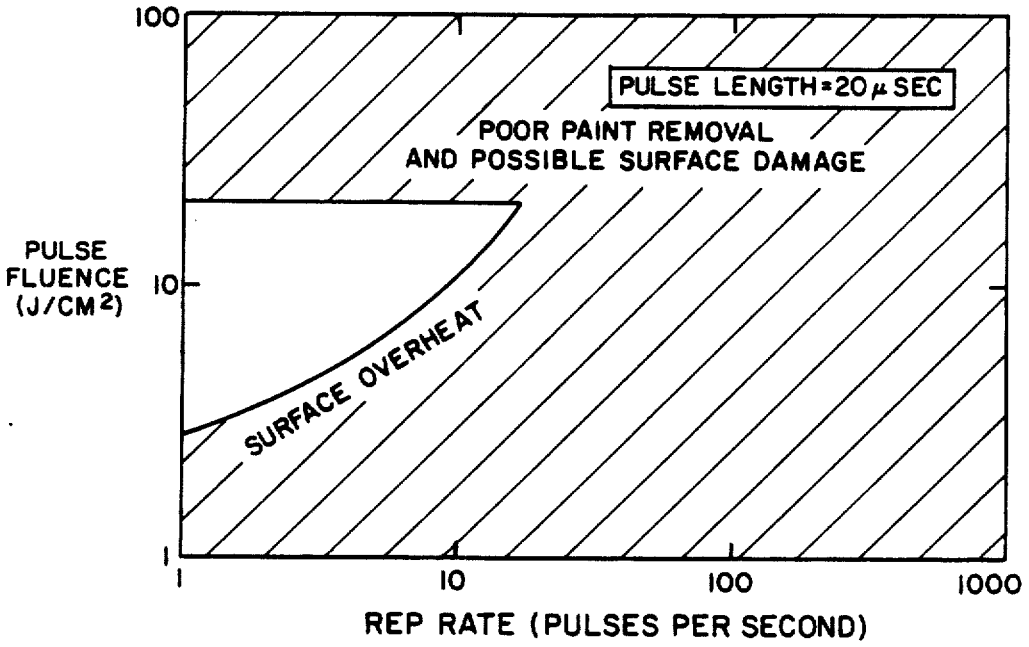
FIG. 3 is a graphic representation illustrating approximately the region that may be expected for satisfactory performance for a given application for removing paint from a composite substrate utilizing a 20 $\mu$sec pulse length.

FIG. 3 is similar to FIG. 1 and illustrates that while paint can, in fact, be removed from a composite substrate such as, for example, graphite epoxy, the region for satisfactory removal is reduced as compared to that of FIG. 1 due to the inherent and obvious differences between an aluminum skin and a composite skin (primarily thermal diffusivity). Paint removal tests were successfully carried out at 6 J/cm$^2$ with a 15 μsec pulse length and laser repetition rate of 5 pulses per second.

Figure 4:
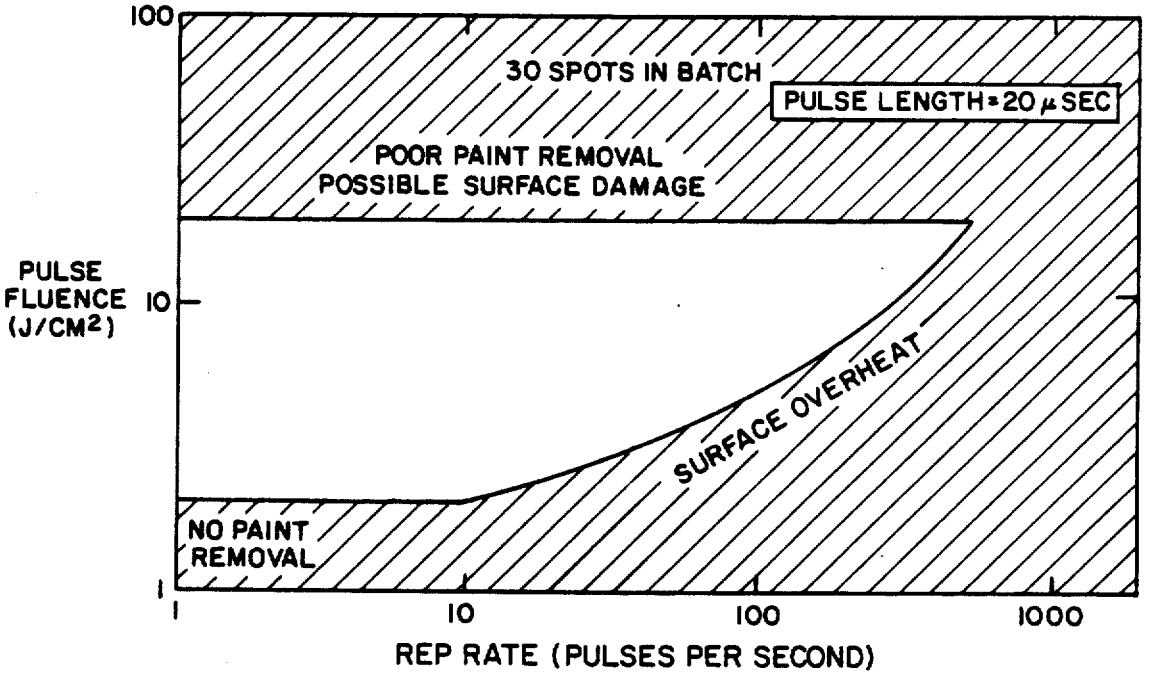
FIG. 4 is a graphic representation illustrating for the same conditions of FIG. 1 the extent to which the region for satisfactory performance may be increased by utilizing "batch" processing in accordance with the invention.

FIG. 4 is also similar to FIG. 3 and illustrates the increased size of the operating window by using "batch" processing for a composite skin.

As may be readily seen from a comparison of FIGS. 3 and 4, the use of the "batch" technique in accordance with this invention substantially increases the parameters for removal of paint or the like from a composite substrate as compared to those parameters permitting paint removal where a different technique is used.

Thus, as illustrated by FIG. 4, a conventional pulsed laser otherwise suitable for the purposes of this invention in removing paint or the like from a composite substrate, but having a conventional and excessively high repetition rate that renders it unsuitable, may, in fact, be used to permit operation that would otherwise be impossible. Thus, if the beam of such a laser is made in conventional manner to sweep over a surface such that substantially each spot is illuminated the number of times necessary to satisfactorily ablate the material to be removed, at a rate that is a fraction of the pulse repetition rate of the laser, and for each time the aforementioned spot is illuminated, a number of consecutive spots substantially the reciprocal of the aforementioned fraction (one of which spots may be the spot being processed) are consecutively illuminated, the material will be satisfactorily ablated in accordance with the invention.

If, for example, the laser beam of such a high repetition rate pulsed laser is merely caused to pause over each spot for a period of time sufficient to deliver thereto a desired number of pulses, the size of the available window of operating parameters will be of the unsatisfactory small (if not nonexistent) size illustrated by FIG. 3. Using the "batch" technique as disclosed herein permits satisfactory material removal, especially from a composite substrate, with a large number of lasers having different operating parameters or operating parameters that would otherwise render them unsatisfactory.

Figure 5:
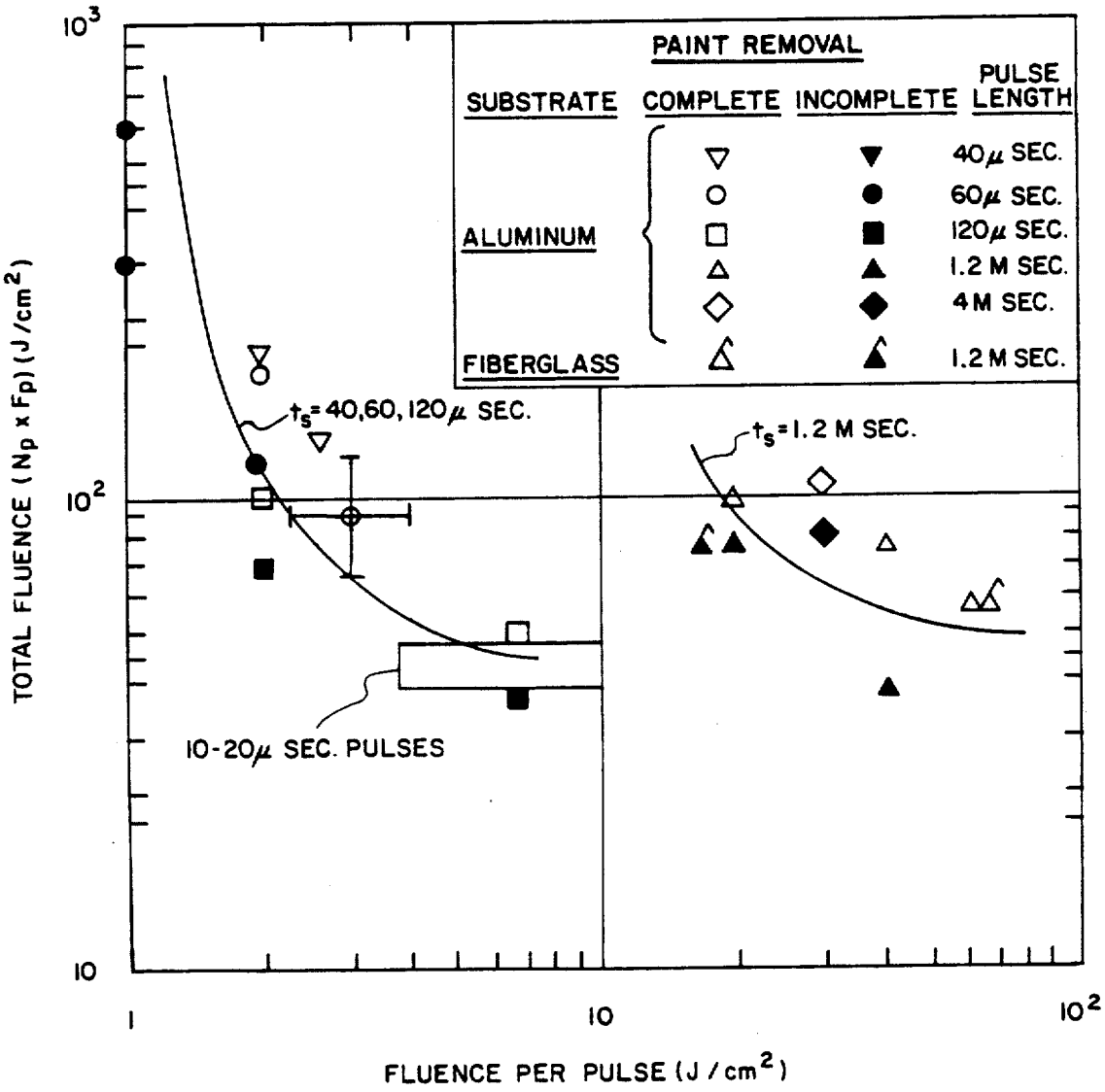
FIG. 5 is a graph representation illustrating the amount of CW or repetitive pulsed laser energy required to remove paint as a function of operating conditions.

FIG. 5 is a graphic representation of experimental data using both CW and pulsed laser beams for stripping, in accordance with the invention, paint approximately 0.002 inches thick. These tests were conducted with paint samples according to the aforementioned MIL specification. It may be seen from FIG. 5 that efficient and satisfactory paint removal in accordance with the invention occurs at relatively long pulse lengths as seen by the substrate using a CW laser if the laser flux (fluence per pulse divided by the pulse length) is high enough.

Directing attention now to FIG. 5, there is shown experimental data for removing paint from different substrates (aluminum and fiberglass) for different laser pulse or effective pulse lengths related to fluence per pulse in joules per square centimeter and total fluence [fluence per pulse ($F_p$) times the number of pulses ($N_p$)] in joules per square centimeter.

The continuous curved line at the left side of FIG. 5 and the continuous curved line at the right side of FIG. 5 designate approximately the boundary between operating conditions that do not result in satisfactory paint stripping and those conditions that do result in satisfactory paint stripping for different pulse lengths. Thus, the left-hand continuous line designates approximately the boundary for satisfactory paint stripping for effective pulse lengths of 40, 60 and 120 μsec pulses. The rectangular area delineated at the bottom of the left-hand curved line designates the boundary for pulses of 10–20 μsec in duration. Similarly, the right-hand continuous line designates approximately the boundary for an effective pulse length of 1.2 msec. The small circle and crossed lines is an "error bar" designating approximately the uncertainty of all of the measurements.

It will be seen from FIG. 5 that, for example, for 1.2 msec pulses, the fluence per pulse ($F_p$) was approximately 60 joules and the total fluence was also approximately 60 joules, i.e., such a single pulse is effective.

For 4.0 msec pulses, the fluence per pulse was approximately 30 joules and the total fluence was approximately 120 joules, i.e., about four such pulses are required for satisfactory paint stripping. Effective pulse lengths in accordance with the invention may vary from a minimum of about three microseconds to a maximum of about four thousand microseconds with a total energy applied per square centimeter of not greater than about one hundred joules for each thickness of paint of about 0.003 inches.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. The method of removing by ablation at least one layer of paint disposed directly on and carried by a substrate without adversely affecting the paint carrying surface of said substrate, comprising:

(a) generating a pulsed laser beam having a wavelength that is at least substantially absorbed by said paint, the pulses of said laser beam having a length greater than about three microseconds and less than about four thousand microseconds and a repetition rate of greater than about one and less than about one thousand pulses per second;

(b) causing said laser beam to impinge on and to move over said paint;

(c) providing in said laser beam pulses, energy greater than about two and less than about one hundred joules per square centimeter, said pulse terminating before at least a substantial portion of the energy in said pulse diffuses away from the surface of said paint;

(d) controlling the travel of said laser beam over said paint to effect delivery of a plurality of pulses of said laser beam energy to sequential portions of said paint in a time to limit the total energy applied per square centimeter to not greater than about one hundred joules per square centimeter of about each 0.003 inches of paint thickness whereby said paint is ablated without substantially adversely affecting the paint carrying surface of said substrate, said plurality of pulses being delivered to each sequential portion within a predetermined period of time whereby at least substantially all of said paint in each portion is removed without substantially adversely affecting said substrate, said pulse repetition rate is substantially greater than the rate at which said number of pulses is delivered to each sequential portion, the predetermined rate at which said number of pulses is delivered to each sequential portion substantially defines a fraction of the said pulse repetition rate, and said laser beam is caused to sequentially travel over a number of portions substantially equal to the reciprocal of said fraction and return to the first of such number of portions until said plurality of pulses are delivered to each said portion.

2. The method as defined in claim 1 wherein said substrate is composed of a nonmetallic composite material.

*3. The method of removing by ablation at least one layer of paint disposed directly on and carried by a substrate without adversely affecting the paint carrying surface of said substrate, comprising:*

*(a) generating a pulsed laser beam having a wavelength that is substantially absorbed by said paint, the pulses of said laser beam having a length greater than about three microseconds and less than about four thousand microseconds and having a predetermined repetition rate;*

*(b) causing said laser beam to impinge on and to move over said paint;*

*(c) providing in said laser beam pulses, energy greater than about two and less than about one hundred joules per square centimeter, said pulse terminating before at least a substantial portion of the energy in said pulse diffuses away from the surface of said paint;*

*(d) controlling the travel of said laser beam over said paint to effect delivery of a plurality of pulses of said laser beam energy to sequential portions of said paint in a time to limit the total energy applied per square*

*centimeter to not greater than about one hundred joules per square centimeter of about each 0.003 inches of paint thickness whereby said paint is ablated without substantially adversely affecting the paint carrying surface of said substrate, said plurality of pulses being delivered to each sequential portion within a predetermined period of time whereby at least substantially all of said paint in each portion is removed without substantially adversely affecting said substrate, said pulse repetition rate is substantially greater than the rate at which said number of pulses is delivered to each sequential portion, the predetermined rate at which said number of pulses is delivered to each sequential portion substantially defines a fraction of the said pulse repetition rate, and said laser beam is caused to sequentially travel over a number of portions substantially equal to the reciprocal of said fraction and return to the first of such number of portions until said plurality of pulses are delivered to each said portion.*

*4. In a method of removing paint from a substrate without adversely affecting the substrate including the steps of generating a laser beam having a wavelength that is substantially absorbed by the paint, causing the laser beam to impinge upon and move over the paint, and controlling the travel of the laser beam over the paint to deliver a predetermined plurality of pulses of laser beam to portions of said paint sufficient to ablate said paint from said portions, wherein the improvement comprises:*

*delivering a first plurality of pulses to sequential portions of said paint within a predetermined period of time, said first plurality of pulses for each portion being less than said predetermined plurality of pulses to ablate paint from each portion and, delivering at least one additional plurality of pulses to at least some of said sequential portions by returning said laser beam to said sequential portions and delivering at least a second plurality of pulses to said sequential portions until the number of pulses delivered to at least one of said sequential portions substantially equals said predetermined plurality of pulses.*

*5. A method of removing poor thermally-conductive material from a substrate without substantially adversely affecting the substrate, the method comprising the steps of:*

*generating a pulsed laser beam having a wavelength that is substantially absorbed by said material, each pulse of said laser beam having a pulse length of between about three and about four thousand microseconds and having a pulse repetition rate greater than one pulse per second;*

*causing said laser beam to impinge upon and move over said material;*

*providing in each of said laser beam pulses energy of about two to about one hundred joules per square centimeter; and*

*controlling the movement of said laser beam over said material for delivering a first series of a first plurality of pulses to different portions of said paint in a sequential manner, said first plurality of pulses being less than a required predetermined plurality of pulses to ablate material from said substrate, and returning said laser beam to a beginning of said different portions and delivering at least one additional series of a plurality pulses until said material is ablated.*

* * * * *